United States Patent
Wu

(10) Patent No.: US 7,383,543 B2
(45) Date of Patent: *Jun. 3, 2008

(54) MANAGEMENT OF REUSE INVALIDATION BUFFER FOR COMPUTATION REUSE

(75) Inventor: Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 757 days.

This patent is subject to a terminal disclaimer.

(21) Appl. No.: 10/410,032

(22) Filed: Apr. 8, 2003

(65) Prior Publication Data

US 2003/0204666 A1    Oct. 30, 2003

Related U.S. Application Data

(63) Continuation of application No. 09/608,453, filed on Jun. 29, 2000, now Pat. No. 6,629,314.

(51) Int. Cl.
G06F 9/45    (2006.01)
(52) U.S. Cl. ...................................... 717/153
(58) Field of Classification Search ............... 717/153, 717/122; 712/207, 216, 227, 239, 245
See application file for complete search history.

(56) References Cited

U.S. PATENT DOCUMENTS

| | | | | |
|---|---|---|---|---|
| 5,701,480 A | * | 12/1997 | Raz | 718/101 |
| 5,742,805 A | * | 4/1998 | Kulkarni et al. | 712/239 |
| 5,845,101 A | * | 12/1998 | Johnson et al. | 712/207 |
| 5,845,103 A | * | 12/1998 | Sodani et al. | 712/216 |
| 5,859,979 A | * | 1/1999 | Tung et al. | 709/228 |
| 5,883,901 A | * | 3/1999 | Chiu et al. | 370/508 |
| 6,009,463 A | * | 12/1999 | Brandt et al. | 709/213 |
| 6,101,533 A | * | 8/2000 | Brandt et al. | 709/213 |
| 6,353,612 B1 | * | 3/2002 | Zhu et al. | 370/360 |

OTHER PUBLICATIONS

Avinash Sodani and Gurindar S. Sohi, "Dynamic Instruction Reuse", Jun. 1-4, 1997, "Proceedings of the 24th international symposium on Computer architecture", p. 194-205.*
Jian Huang and Lilja, D.J, "Eploiting basic block value locality with block reuse", Jan. 9-13, 1999, IEEE, "High-Performance Computer Architecture, 1999. Proceedings. Fifth International Symposium On", p. 106-114.*
Daniel A. Connors and Wen-mei W. Hwu, "Compiler-Directed Dynamic Computation Reuse: Rationale and Initial Results", Nov. 1999, "Proceedings of the 32nd annual ACM/IEEE international symposium on Microarchitecture", p. 158-169.*

(Continued)

Primary Examiner—Wei Zhen
Assistant Examiner—Anna Deng
(74) Attorney, Agent, or Firm—Blakely, Sokoloff, Taylor & Zafman LLP

(57) ABSTRACT

A mechanism for maintaining reuse invalidation information includes a reuse buffer and a reuse invalidation buffer. The reuse buffer stores multiple instances of the reuse region. Each instance stored in the reuse buffer is identified by one or more versions. The reuse invalidation buffer contains multiple entries. Each entry in the reuse invalidation buffer includes one or more pairs of pointers pointing to instances and versions of instances held in the reuse buffer.

15 Claims, 7 Drawing Sheets

OTHER PUBLICATIONS

Avinash Sodani, et al. "Dynamic Instruction Reuse", ACM Press, May 1997, ISCA '97, vol. 25, Issue 2, pp. 194-205.*

Connors, D., et al., "Compiler-Directed Dynamic Computation Reuse: Rationale and Initial Results," 32th International Symposium on Microarchitecture (Micro32), Nov.-Dec. 1999.

Dulong, C., "An Overview of the Intel IA-64 Compiler," Intel Technology Journal, Q4, An Overview of the Intel IA-64 Compiler, 1999.

* cited by examiner

MANAGEMENT OF REUSE INVALIDATION BUFFER FOR COMPUTATION REUSE

RELATED APPLICATIONS

This application is a continuation of U.S. patent application Ser. No. 09/608,453, now U.S. Pat. No. 6,629,314, filed Jun. 29, 2000.

FIELD OF THE INVENTION

The present invention relates generally to microprocessors, and more specifically to microprocessors capable of reusing regions of software code.

BACKGROUND OF THE INVENTION

Modern software programs include many instructions that are executed multiple times each time the program is executed. Typically, large programs have logical "regions" of instructions, each of which may be executed many times. When a region is one that is executed more than once, and the results produced by the region are the same for more than one execution, the region is a candidate for "reuse." The term "reuse" refers to the reusing of results from a previous execution of the region.

For example, a reuse region could be a region of software instructions that, when executed, read a first set of registers and modify a second set of registers. The data values in the first set of registers are the "inputs" to the reuse region, and the data values deposited into the second set of registers are the "results" of the reuse region. A buffer holding inputs and results can be maintained for the region. An entry in the buffer is termed an "instance." When the region is encountered during the execution of the program, the buffer is consulted and if an instance with matching input values is found, the results can be used without having to execute the software instructions in the reuse region. When reusing the results is faster than executing the software instructions in the region, performance improves.

The example of the previous paragraph works well when the results are a function of nothing but the input values. When the results are a function of more than the input values, reuse is more complicated. For example, if a memory load instruction occurs in the reuse region, the results can be a function of the input values as previously described, and can also be a function of the data value loaded from the memory. If the memory load instruction accesses a memory location that is changed by a memory update instruction outside the region, then the region is said to be "aliased."

Aliased regions present a problem for reuse. Even when a matching instance exists in the reuse buffer, the reuse instance may not be usable because the aliased memory load instruction may read a different value that causes the correct results to differ from the results in the instance. Therefore, it is important to identify reuse instances that cannot be reused. One approach is to use an "invalidate" instruction that is placed after memory update instructions capable of writing to the same location that the aliased load instruction accesses. Typically, the invalidation instruction includes a parameter identifying a reuse region. When the invalidation instruction is executed, reuse instances of the reuse region are invalidated.

However, it can be difficult and time consuming to find all of the memory update instructions that may update the aliased address and to insert an invalidation instruction after each found update instruction. Furthermore, even if all of the appropriate instructions can be found, this approach is conservative in part because the memory update instruction may update an address other than the aliased address, but the invalidate instruction will invalidate the region nonetheless.

Therefore, there is a need in the art for an alternate method and apparatus for invalidating instances of aliased reuse regions.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
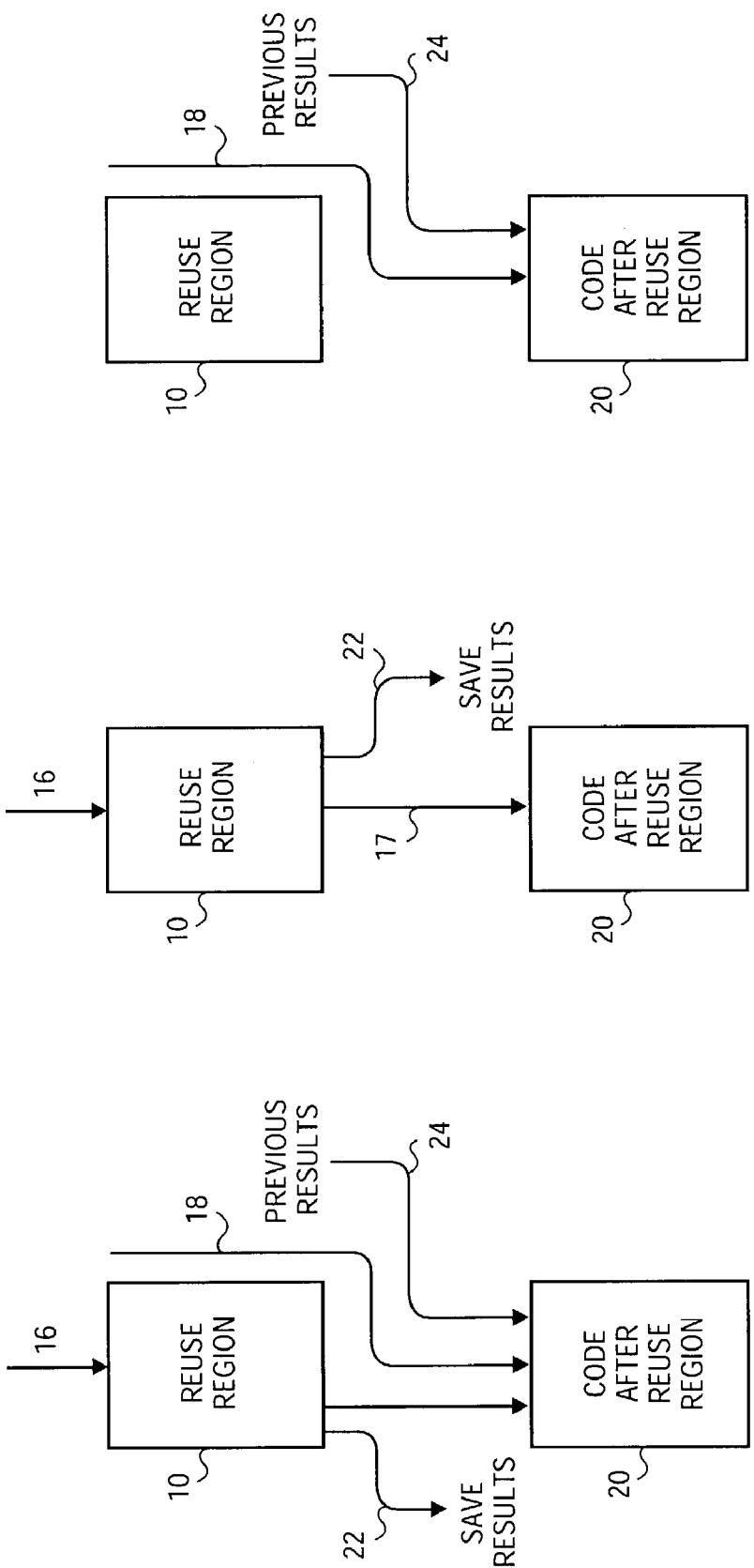
FIGS. 1A-1C illustrate a code reuse region and a code region following the code reuse region in various execution scenarios.

A method and apparatus for invalidating instances of aliased reuse regions are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for maintaining reuse invalidation information. In one embodiment, a reuse buffer and a reuse invalidation buffer are configured to enable invalidation of instances of a reuse region. The reuse buffer is configured to store multiple instances of the reuse region. Each instance stored in the reuse buffer is identified by one or more versions. The reuse invalidation buffer is configured to have multiple entries. Each entry in the reuse invalidation buffer includes one or more pairs of pointers pointing to instances and versions of instances held in the reuse buffer.

In one embodiment, the reuse buffer and the reuse invalidation buffer are combined into one buffer. Alternatively, the reuse buffer and the reuse invalidation buffer are two independent buffers that cooperate to enable invalidation of reuse instances of aliased reuse regions.

FIGS. 1A-1C illustrate a code reuse region and a code region following the reuse region in various execution scenarios. Referring to FIG. 1A, reuse region 10 is followed by code region 20. Code region 20 logically follows reuse region 10, and does not necessarily physically follow reuse region 10. For example, code region 20 can include code that resides contiguous with reuse region 10 in memory, or can include code that does not reside contiguous with reuse region 10. Examples of non-contiguous regions include code in another function or code in another library.

Reuse region 10 is a code region designated by a compiler as a reuse region. When reuse region 10 is executed, as shown by path 16, results of the execution of reuse region 10 are stored, as shown by path 22, in an instance in a reuse buffer (not shown). Subsequently, when region 10 is encountered and a valid matching instance is found in the reuse buffer, previous results may be reused, as shown by path 24, and code region 20 may be able to be executed immediately, as shown by path 18. A matching instance is valid if it has not been invalidated, thereby becoming unusable. The invalidation process will be described in greater detail below.

For completeness, FIG. 1A shows many different possible paths. Not all of the paths listed are necessarily taken when a processor encounters reuse region 10. During execution, a processor identifies reuse region 10, searches the reuse buffer and performs accordingly. Some possible scenarios are shown in FIGS. 1B-1C.

FIG. 1B corresponds to an execution of reuse region 10 when a valid matching instance does not exist in the reuse buffer. When a processor encounters reuse region 10, and no valid matching instance exists in the reuse buffer, reuse region 10 is executed as shown by path 16 in FIG. 1B. After reuse region 10 is executed, an instance in the reuse buffer can be created, and the results of the execution of reuse region 10 can be saved in the instance as shown by path 22. This is termed "memorization phase." During the memorization phase, instances are created and saved in the reuse buffer for later use. The processor continues on by executing code region 20 as shown by path 17.

FIG. 1C shows a scenario where a valid matching instance exists in the reuse buffer. The results stored in the matching instance can be used and code region 20 can be executed directly. When a matching instance is found and it is determined that the matching instance is valid (i.e., it has not been invalidated), the previous results from the matching instance are reused as shown by path 24, and execution bypasses reuse region 10 and proceeds directly to region 20 as shown by path 18.

In one embodiment, when a matching instance is found but it is determined that the matching instance has been invalidated, reuse region 10 is executed as illustrated in FIG. 1B. Alternatively, in this situation, speculative execution may be used. That is, reuse region 10 and code region 20 are executed in parallel. Like the scenario of FIG. 1C, code region 20 is executed using the previous results from the matching instance. In the meantime, reuse region 10 is executed in parallel with code region 20 to verify that the previous results are still valid. If the previous results are still valid, then the speculative execution can become non-speculative, or be "committed," and if the previous results are not still valid, then the speculative execution is thrown away, or "squashed."

FIGS. 1A-C are logical diagrams that include mechanisms capable of implementation in hardware or software. In some embodiments, the entire implementation is in hardware. This provides a very fast implementation. In other embodiments, a mix of hardware and software is used. In one embodiment, the compiler that compiled the reuse regions aids in the reuse of code by adding instructions to signal to the hardware that reuse is possible. In some embodiments, the compiler adds "end of region" instructions to signal the end of a reuse region and annotates aliased memory operations such as aliased memory load or update instructions. As discussed above, a memory operation instruction is aliased if it accesses a memory location that may be changed by a memory update instruction outside the region.

The compiler may also add "exit of region" instructions to signal that execution of the program will continue outside of the reuse region before reaching the end of the region. In addition, the compiler may annotate register update instructions as "live-in" or "live-out" instructions. Live-in instructions are instructions that use registers not yet defined and whose results are inputs to the region. Live-out instructions are those instructions whose results outlive the execution of the region and become outputs of the region. Examples of live-out instructions include register update instructions that update registers utilized outside the scope of the reuse region.

Figure 2:
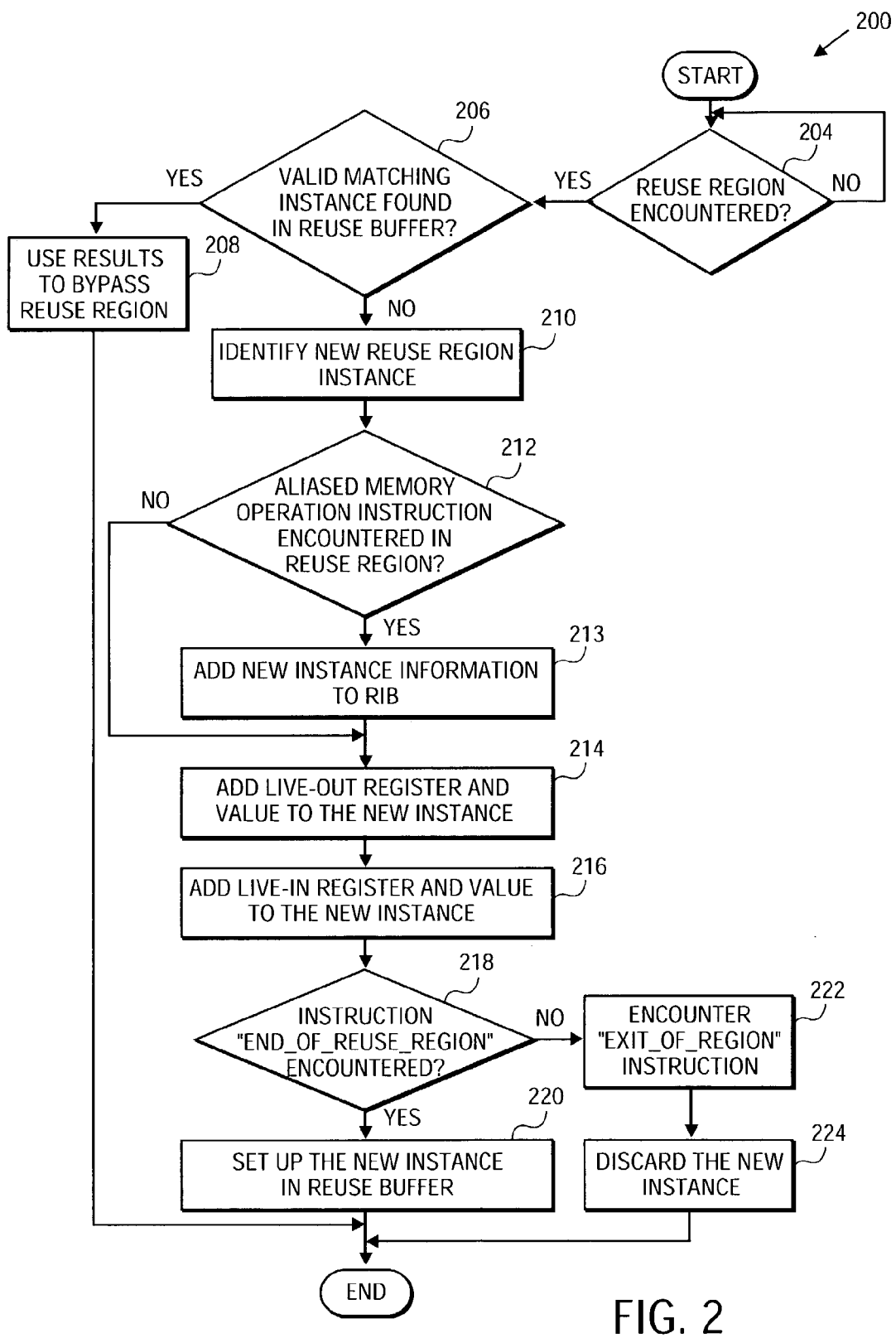
FIG. 2 is flow diagram of one embodiment of a process for reusing regions of code.

FIG. 2 is flow diagram of one embodiment of a process for reusing regions of code. The process is performed by processing logic, which may comprise hardware, software, or combination of both. Processing logic may be either in a processor, or partially or entirely in a separate device and/or system.

Referring to FIG. 2, the process begins with waiting in decision block 204 until a reuse region is encountered. When a reuse region is encountered, decision block 206 determines whether a valid matching instance exists. A matching instance is an instance having input values identical to the input values for the current execution. The matching instance is valid if it has not been invalidated. As will be described in greater detail below, invalidation may happen if the reuse region includes a memory operation instruction that accesses an aliased memory address. If the matching instance has not been invalidated, the results of the matching instance are used to bypass the reuse region in processing block 208.

Otherwise, if a matching instance either does not exist in the reuse buffer or does exist but has been invalidated, the memorization phase begins by identifying a new instance in processing block 210. In one embodiment, a new instance replaces an existing instance in the reuse buffer. Specifically, the reuse buffer maintains a certain number of instances for each reuse region. When a new instance needs to be created, an existing instance is identified for replacement by the new instance. In one embodiment, the new instance replaces the least recently used instance. In one embodiment, the new instance is allocated in the reuse buffer at the beginning of the memorization phase. Alternatively, the new instance is not allocated in the reuse buffer until the memorization phase competes successfully. In this embodiment, described in greater detail below in conjunction with FIG. 4A, a temporary instance is created for the new instance.

Next, processing logic waits at decision block 212 until an aliased memory operation instruction is encountered during the execution of the reuse region. An aliased memory operation instruction is a memory load or update instruction that accesses an aliased memory address, i.e., a memory address that may be updated by a memory update instruction outside the region. When the aliased memory operation instruction is encountered, new instance information is added to a reuse invalidation buffer at processing block 213.

When the aliased memory address accessed by the aliased memory operation instruction is already represented by an entry in the reuse invalidation buffer, the new instance information is added to this entry. The new instance information includes a reuse instance index pointing to the new instance and a version index pointing to a certain version of the new instance. Otherwise, if no matching entry exists, a new entry is added to the reuse invalidation buffer. The entry includes the address of an aliased memory location accessed by the memory operation instruction and the size of the aliased memory location. In addition, the new instance information including the reuse instance index and the version index is added to this entry as described in greater detail below.

If no aliased memory operation instruction is encountered, the process skips processing block 213 and proceeds directly to processing block 214, at which one or more live-out registers and their values are added to the new instance. Similarly, at processing block 216, live-in registers and their values are added to the new instance.

Further, processing logic waits at decision block 218 until an "end of reuse region" instruction is encountered. When this instruction is encountered, the new instance is set in the reuse buffer (processing block 220) as will be described in more detail below. Otherwise, if this instruction is not encountered and, instead, an "exit of reuse region" instruction is encountered (decision block 222), then the new instance is discarded at processing block 224.

Figure 3A:
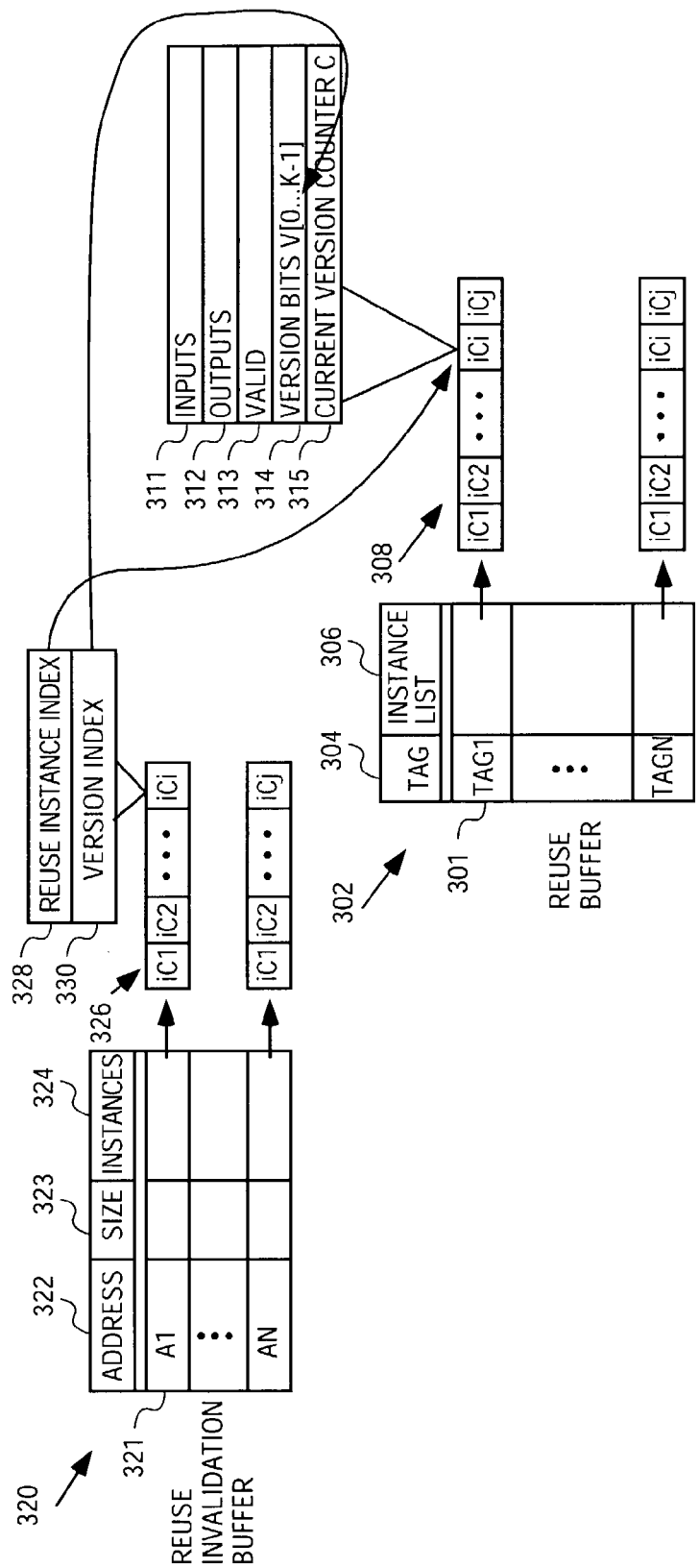
FIGS. 3A and 3B are block diagrams of two embodiments of a reuse buffer and a reuse invalidation buffer.

FIG. 3A is a block diagram of one embodiment of a reuse buffer and a reuse invalidation buffer. In one embodiment, reuse buffer 302 and reuse invalidation buffer 320 can be combined into one buffer. Alternatively, reuse buffer 302 and reuse invalidation buffer 320 can be used as two separate buffers.

Reuse buffer 302 includes multiple entries, each entry having a tag field 304, and an instance list 306. Tag field 304 uniquely identifies reuse regions that have instance lists included within reuse buffer 302. For example, entry 301 has a tag field value of "TAG1," and the corresponding instance list is shown in an exploded view as instance list 308. Instance list 308 includes a number of reuse instances for the reuse region corresponding to entry 301 in reuse buffer 302. Each instance entry in instance list 308 may include input information 311 (e.g., live-in registers and their values), output information 312 (e.g., live-out registers and their values) and a valid flag 313 for each instance. In addition, the instance entry includes a set of version bits 314 and a current version counter. The set of version bits 314 is used to identify versions of the reuse instance. The current version counter 315 points to the most recently created version of the reuse instance. In some embodiments, other fields are included in an instance entry, such as a field carrying least recently used information for replacement purposes. Each instance in instance list 308 has a unique reuse instance index, allowing each reuse instance to be individually identified.

Reuse invalidation buffer 320 includes a number of entries, each having a value for address field 322, a size field 323, and instances field 324. For each entry, address field 322 holds an address of an aliased memory location accessed by an aliased memory operation instruction within aliased reuse regions. Size field 323 holds a size of this memory location. Instances field 324 holds instance information of reuse instances held in reuse buffer 302. As shown in an exploded view 326, instances field 324 in each entry of reuse invalidation buffer 320 may contain instance information for multiple instances. The instance information for each reuse instance includes a reuse instance index 328 pointing to a reuse instance in reuse buffer 302 and a version index 330 pointing to a specific version of this reuse instance. Maintaining multiple versions of an instance by utilizing version index 330 in cooperation with a set of version bits 314 and current version counter 315 for each reuse instance enables replacement of reuse instances and reduces false invalidation.

When a software program is compiled, the compiler identifies memory operation instructions within reuse regions as aliased or non-aliased. When an aliased memory operation instruction that accesses an aliased memory location is encountered during memorization of a reuse instance, a new entry is created in reuse invalidation buffer 321, if no entry with matching aliased memory address exists. The new entry includes the address of the aliased memory location, the size of the aliased memory location, and instance information such as a reuse instance index of the reuse instance and a version index of the reuse instance. Alternatively, if an entry with a matching aliased memory address already exists in reuse invalidation buffer 320, the instance information is added to this entry. As a result, each entry of reuse invalidation buffers 320 contains a list of all instances of aliased reuse regions that access a corresponding aliased memory location.

In one embodiment, each entry of reuse invalidation buffer 320 can be shared by multiple aliased memory operations. This embodiment may be implemented when the size of reuse invalidation buffer 320 becomes an issue. For example, a reuse region may contain loops resulting in numerous accesses of various aliased memory locations. Accordingly, aliased memory operations of such a reuse region may utilize a majority of entries in reuse invalidation buffer 321 unless buffer 321 is very large. In order to reduce the size of reuse invalidation buffer 321, each entry in buffer 321 can accommodate multiple aliased memory operations using address field 322 along with size field 323.

In one embodiment, reuse invalidation buffer 320 has a directly mapped structure. In this embodiment, all aliased memory locations with the same high order address value share one entry in reuse invalidation buffer 320. The memory locations have the same high order address value when an initial portion of their addresses is the same. For example, a memory location identified by an address value of "0×0800" and a memory location identified by an address value "0×0899" may share the same entry in reuse invalidation buffer 320 because all but the lowest eight bits of their address values are the same.

When a new aliased memory operation instruction is encountered and all entries in reuse invalidation buffer 320 are occupied, a new entry may replace an existing entry. However, discarding the existing entry results in invalidation of all associated reuse instances in reuse buffer 302. To avoid this unnecessary invalidation, the new entry is mapped to an existing entry which has an available slot for new instance information (i.e., a reuse instance index and a version index for the instance being memorized). The address and size values of this entry are then updated accordingly. Specifically, the address field of the entry is updated with the smallest value between the address of the existing entry and the address of the new entry. The size value is calculated according to the following formula:

$$\max(\text{addr1}+\text{size1}, \text{addr2}+\text{size2}) - \min(\text{addr1}, \text{addr2}),$$

where addr1 and size1 are the address and size of the new entry, and addr2 and size2 are the address and size of the existing entry.

In another embodiment, reuse invalidation buffer 320 has a set-associative structure. In this embodiment, a new aliased memory operation is mapped to a set of entries in reuse invalidation buffer 320. That is, if any entry in the set of entries is unused, the new aliased memory operation uses the available entry. If all the entries in the set of entries are occupied, an entry with an unused slot for new instance information is used (or if none are available, an occupied slot is replaced with the new instance information). Address field 322 and size field 323 of this entry are then updated according to the above formula.

As described above, each instance information in instances field 324 includes reuse instance index 328 of the reuse instance and a version index 330 of the reuse instance. In some embodiments, when memorization of a reuse instance begins, an existing instance is identified in reuse buffer 302 for replacement by the new reuse instance. Then, a reuse instance index is defined for the new instance. When an aliased memory operation instruction is encountered during the memorization phase, the new instance information that includes the reuse instance index is added to reuse invalidation buffer 320. The new instance information also includes a version index. In one embodiment, the version index is defined using current version counter 315 of the existing instance. Specifically, the version index 330 is calculated as (C+1) MOD K, where C is the current version counter of the existing instance and K is the number of version bits in the set of version bits of the existing instance.

When the memorization phase ends successfully, the existing instance information (e.g., input information, output information, etc.) is replaced with information of the new instance. Accordingly, the current version counter is now set to (C+1) MOD K to point to a version bit that corresponds to the instance version identifying the created new instance. In addition, this bit is now set to 1 and all other bits in the set of version bits 314 are set to 0). As a result, corresponding reuse instance index 328 points to the new instance in reuse buffer 302 and version index 330 points to a particular version bit in the set of version bits 314 of the new instance. The value of the version bit defines whether an instance version is current. Specifically, if the version bit is set to 1, the instance version is current. Otherwise, if the version bit is set to 0, the instance version is no longer current, i.e., the version of the instance has been replaced or otherwise discarded.

In some embodiments, the chance of discarding the reuse instance being memorized is high. As described above, discarding the reuse instance may happen, for example, if an "exit of reuse region" instruction is encountered during the execution of the reuse region. When a new reuse instance is allocated in reuse buffer 302 in the place of an existing reuse instance but the new reuse instance is subsequently discarded, then the existing reuse instance was unnecessarily removed from reuse buffer 302. In addition, reuse invalidation buffer 320 now contains useless instance information pointing to the new instance which has been discarded.

Figure 4A:
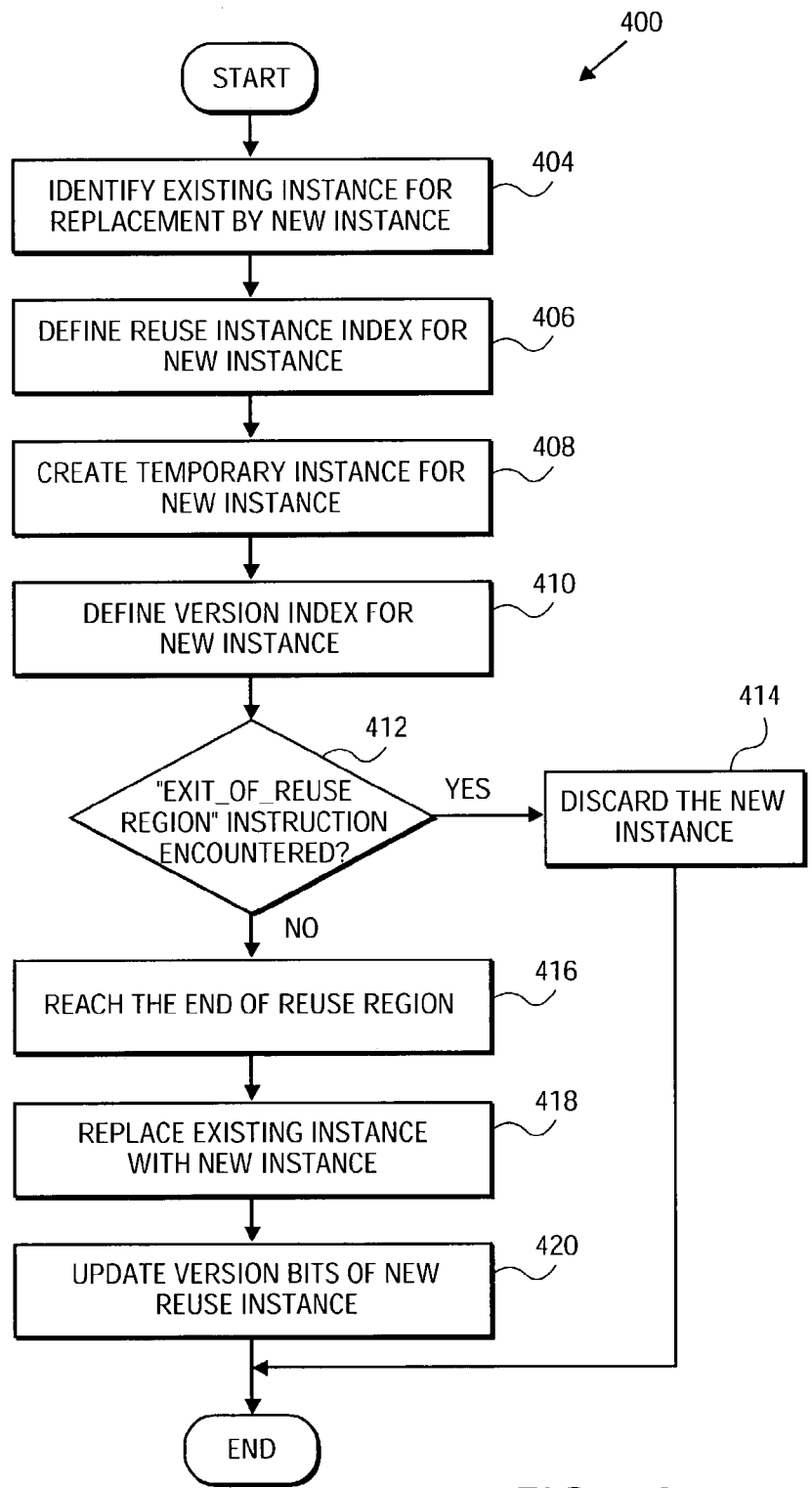
FIG. 4A is a flow diagram of one embodiment of a process for maintaining reuse invalidation information using a temporary reuse instance.

To address the above problems, a temporary instance is created for the new instance which is not allocated in reuse buffer 302 until the memorization phase completes successfully. FIG. 4A is a flow diagram of one embodiment of a process for maintaining reuse invalidation information using a temporary reuse instance. The process is performed by processing logic, which may comprise hardware, software, or combination of both. Processing logic may be either in a processor, or partially or entirely in a separate device and/or system.

Referring to FIG. 4A, the process begins with identifying an existing instance for replacement by a new instance (processing block 404). Next, a reuse instance index is defined for the new reuse instance (processing block 406) and a temporary instance is created for the new instance (processing block 408). At processing block 410, a version index is determined for the new instance. In one embodiment, the temporary instance is considered as a new version of the existing instance, and the version index is calculated as (C+1) MOD K, where C is the current version counter of the existing instance and K is the number of version bits in the set of version bits of the existing instance. Both the reuse instance index and the version index are added to the reuse invalidation buffer as described above. In the meantime, the current version counter of the existing instance is set to as (C+1) MOD K, where C is the current version counter of the existing instance and K is the number of version bits in the set of version bits of the existing instance. Thus, both the version index and the current version counter point to the next version of the existing instance which identifies the new reuse instance. The set of version bits, however, remains unchanged, still identifying an existing instance version as current, i.e., a version bit associated with an existing instance version is set to 1 and all other bits are set to 0.

Further, if an "exit of reuse region" instruction is encountered (decision block 412), the new instance is discarded (processing block 414). The corresponding instance information in the reuse invalidation buffer does not need to be removed, as it may not result in unnecessary invalidation: it points to a version bit that is set to 0, thereby indicating that an associated instance version has been discarded.

Alternatively, if the "exit of reuse region" has not been encountered, the memorization phase completes successfully by reaching an "end of the region" instruction (processing block 416), and the temporary instance is copied to the reuse buffer, replacing the existing instance (processing block 418). Afterwards, the set of version bits of the new instance is updated (processing block 420) to set a version bit associated with the new instance version to 1 and all other bits to 0.

Returning to FIG. 3A, the invalidation process is now described. Each time a memory update instruction, such as a store instruction, is encountered in a program, reuse invalidation buffer 320 is consulted to determine if the memory location accessed is an aliased memory location that will cause a reuse instance to become invalidated. When the address identifying the aliased memory location is found within reuse invalidation buffer 320, the corresponding current versions of instances listed in instances field 324 are invalidated in instance list 306 of reuse buffer 302. For example, if a memory store instruction that accesses memory location "A1" is executed, reuse invalidation buffer 320 is searched and matching entry 321 is found. Each instance information included in the entry 321 is examined. For example, for instance ICi, reuse instance index 328 is used to point to instance ICi in instance list 308 of reuse buffer 302, and version index 330 is used to identify a version bit in the set of version bits 314 of reuse instance ICi. If this version bit is set to 1 indicating that this instance version is current, reuse instance ICi is invalidated by resetting valid flag 313.

Figure 4B:
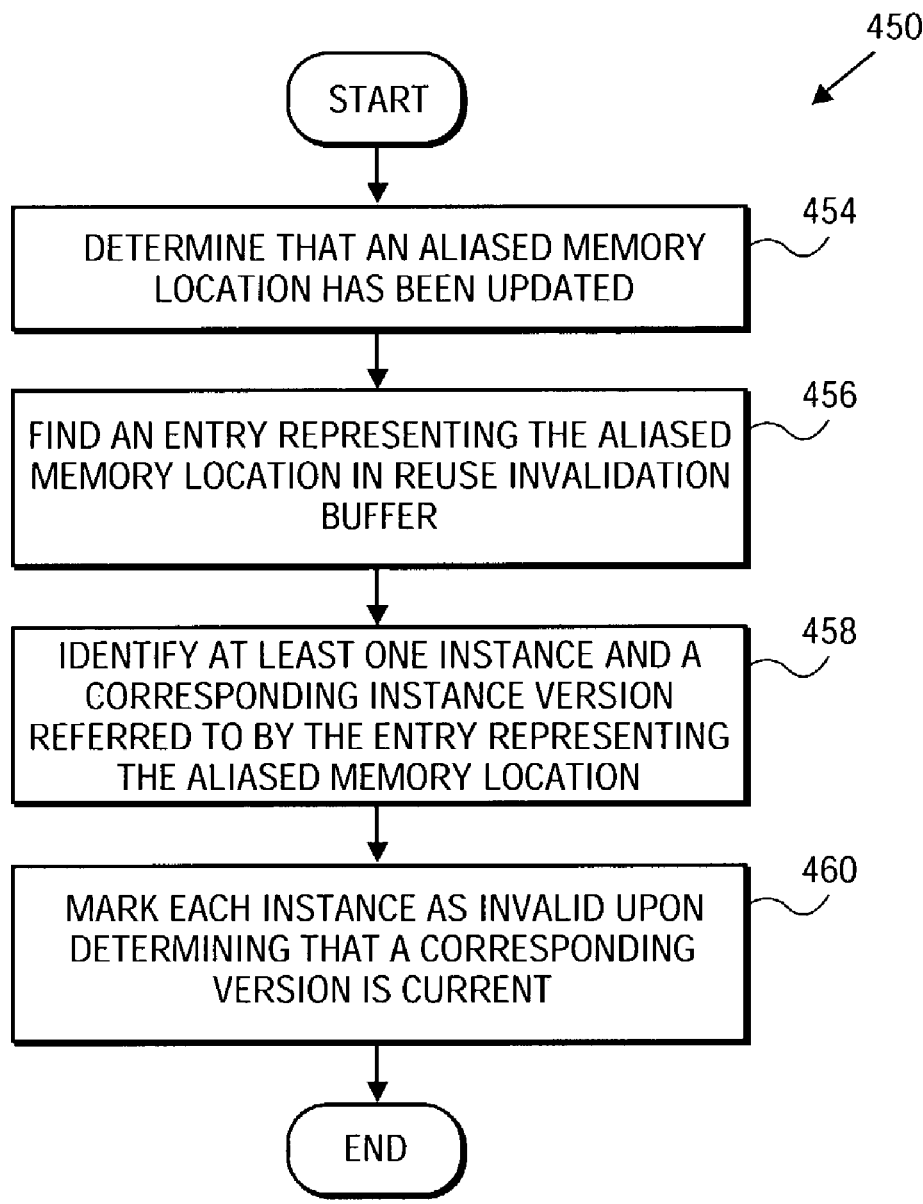
FIG. 4B is a flow diagram of one embodiment of a process for invalidating instances of an aliased reuse region.

FIG. 4B is a flow diagram of one embodiment of a process for invalidating instances of an aliased reuse region. The process is performed by processing logic, which may comprise hardware, software, or combination of both. Processing logic may be either in a processor, or partially or entirely in a separate device and/or system.

Referring to FIG. 4B, the process begins with determining that an aliased memory location was updated (processing block 454). Next, an entry representing the aliased memory location is found in a reuse invalidation buffer (processing block 456). In one embodiment, in which multiple aliased memory operations share the same entry in the reuse invalidation buffer as described above, the entry's address and size values are used to determine whether the entry represents the updated aliased memory location. The following formula may be used to make this determination:

$$[addr1, addr1+size1-1] \cap [addr2, addr2+size2-1] \neq \Phi,$$

where addr1 and size1 are the address and the size of the updated aliased memory location, and addr2 and size2 are the address and the size included in the entry of the reuse invalidation buffer.

At processing block 458, one or more instances and corresponding versions of the instances are identified in the reuse buffer using pointers included in the reuse invalidation buffer entry representing the updated aliased memory location. For each instance, a determination is then made whether the version of this instance is current. If the instance version is current, the instance is marked as invalid at processing block 460. Similarly, all other instances referred to by the reuse invalidation buffer entry are processed for invalidation. When all the instances are processed, the above entry in the reuse invalidation buffer becomes available for holding information pertaining to a new aliased memory operation.

Figure 3B:
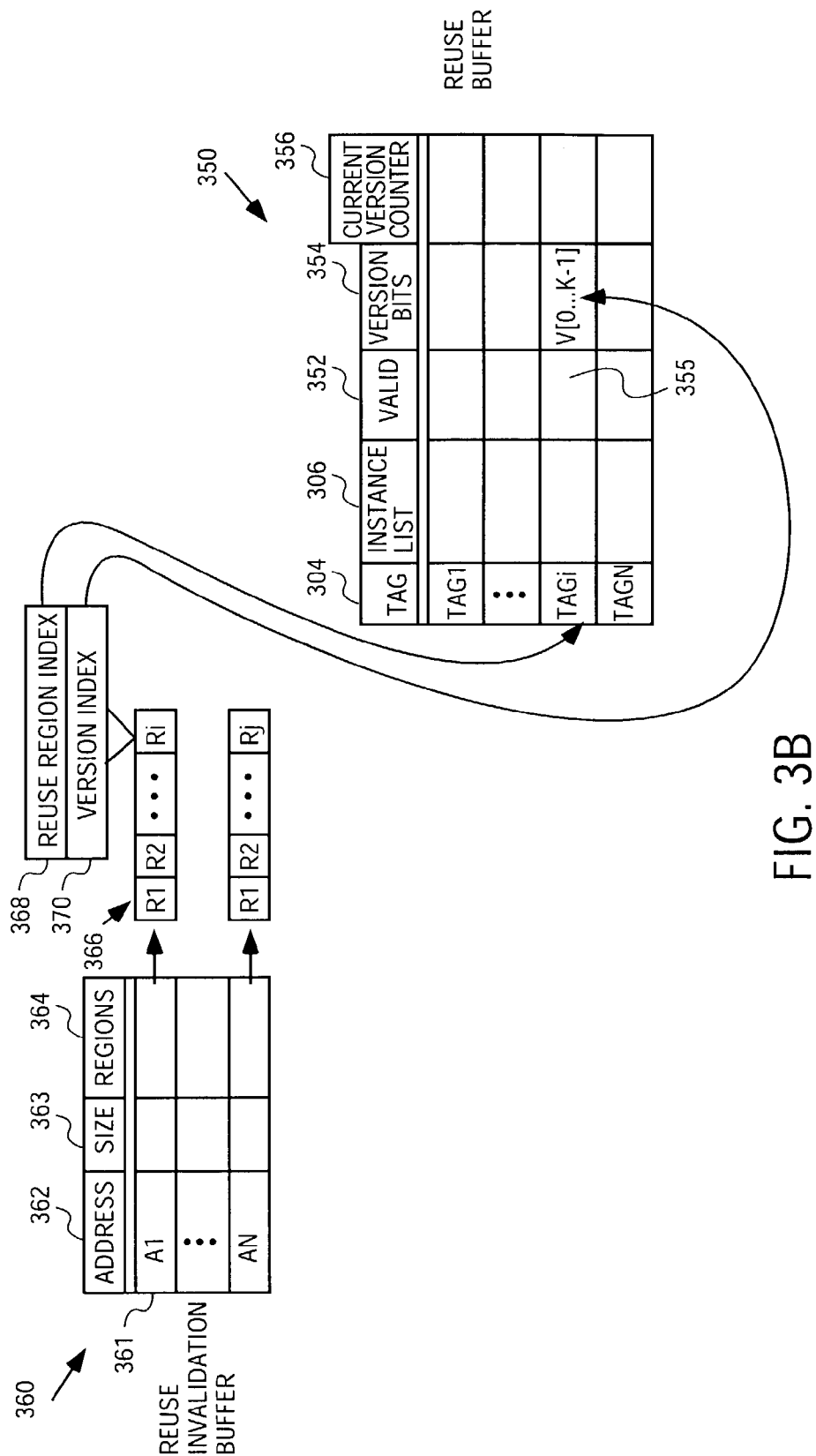

FIG. 3B is a block diagram of one embodiment of a reuse buffer and a reuse invalidation buffer for invalidating entire reuse regions rather than individual reuse instances. FIG. 3B shows reuse buffer 350 and reuse invalidation buffer 360. Reuse buffer 350 includes tag field 304, instance list 306, valid flag 352, a set of version bits 354 and a current version counter 356. Reuse invalidation buffer 360 includes address field 362, size field 363, and regions list 364. Address field 362 and size field 363 include addresses and sizes of aliased memory locations in the same manner as reuse invalidation buffer 320 (FIG. 3A). Regions list field 364 includes a list of reuse regions included within reuse buffer 350. Each region in regions list 366 includes reuse region index 368 and version index 370. When an aliased memory location represented by an entry in reuse invalidation buffer 360 is updated, each of the corresponding regions in reuse buffer 350 is invalidated if its version is current. For example, when a store instruction to address "A1" is executed, reuse invalidation buffer 360 is searched and entry 361 is found. Each region information in entry 361 is examined. For example, reuse region index 368 included in region information Ri may point to reuse region identified by TAGi and version index 370 may point to a certain version bit in the set of version bits of this reuse region. If this version bit is set to 1, valid flag 355 can be reset to mark the reuse region as invalid.

Buffers and lists shown in FIGS. 3A and 3B have labels shown above double lines. For example, reuse buffer (FIG. 3B) is shown with labels "TAG," "INSTANCE LIST," and "VALID." The labels are shown for illustrative purposes, and in some embodiments, are not physically included in the buffers and lists.

Figure 5:
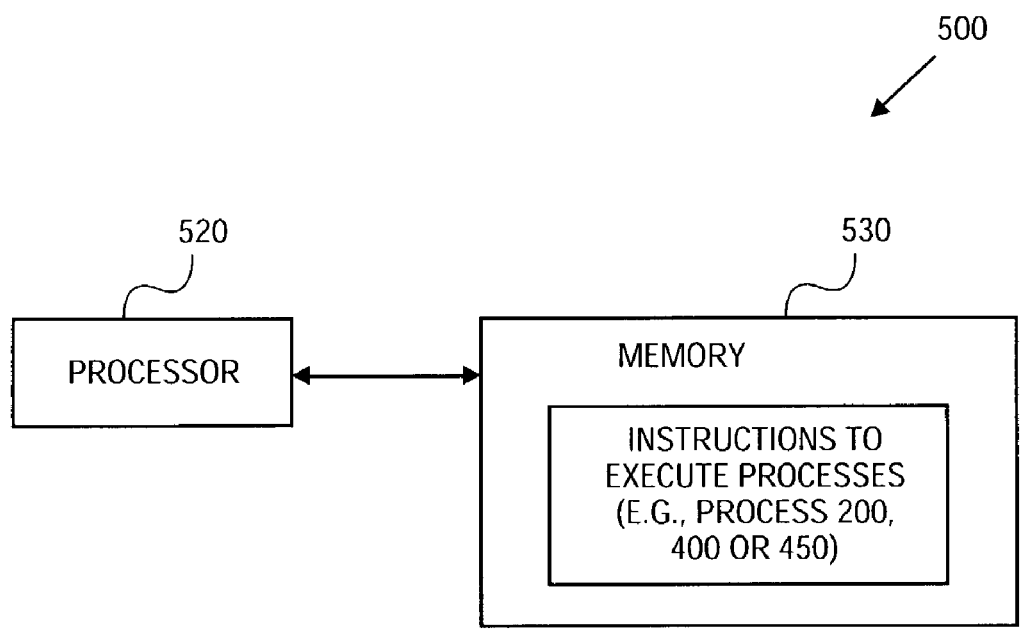
FIG. 5 shows a processing system in accordance with an embodiment of the invention.

FIG. 5 shows a processing system according to an embodiment of the invention. Processing system 500 includes processor 520 and memory 530. In some embodiments, processor 520 is a processor capable of compiling software and annotating reuse regions. Processor 520 can be any type of processor capable of executing software, such as a microprocessor, digital signal processor, microcontroller, or the like. Processing system 500 can be a personal computer (PC), mainframe, handheld device, portable computer, set-top box, or any other system that includes software.

Memory 530 can be a hard disk, a floppy disk, random access memory (RAM), read only memory (ROM), flash memory, or any other type of machine medium readable by processor 520. Memory 530 can store instructions for performing the execution of the various embodiments of the present invention such as processes 200, 400 and 450 (FIGS. 2, 4A-4B) and the process discussed above for compiling and annotating software that includes reuse regions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
a reuse buffer to hold a plurality of instances of a reuse region, each of the plurality of instances being identified by at least one version;
a reuse invalidation buffer to have a plurality of entries; and
a processor core to modify contents of the reuse invalidation buffer, the modifying comprising adding at least one pair of pointers to each of the plurality of entries of the reuse invalidation buffer, the at least one pair of pointers including a first pointer is a reuse instance index pointing to one of the plurality of instances held in the reuse buffer and a second pointer is a version index pointing to a particular version of the one of the plurality of instances held in the reuse buffer.

2. The apparatus of claim 1 wherein each of the plurality of entries of the reuse invalidation buffer comprises:
a memory address representing an aliased memory location accessed by an aliased memory operation instruction within the reuse region;
a size of the aliased memory location.

3. The apparatus of claim 2 wherein the processor core is further to mark as invalid a reuse instance pointed to by the reuse instance index when a corresponding aliased memory address is updated.

4. The apparatus of claim 3 wherein the processor core is configured to mark the reuse instance as invalid upon determining that a reuse instance version pointed to by the version index is current.

5. The apparatus of claim 2 wherein the reuse buffer is configured to maintain a set of version bits and a current version counter for each of the plurality of instances, the set of version bits and the current version counter being modified when a new reuse instance version is created.

6. The apparatus of claim 5 wherein the version index points to a particular version bit within the set of version bits of the reuse instance, the particular version bit indicating whether a corresponding version of the reuse instance is current.

7. An apparatus comprising:
a reuse buffer to hold a plurality of instances of a reuse region;
a reuse invalidation buffer to have a plurality of entries, each of the plurality of entries including a memory address that represents a beginning of a memory area covering multiple aliased memory addresses and a list of pointers including first pointers are reuse instances indexes pointing to corresponding instances within the plurality of reuse instances held in the reuse buffer and second pointers are version indexes pointing to versions of the corresponding instances; and
a processor core to invalidate the corresponding instances in the reuse buffer using the versions, in response to a memory instruction that accesses one of the multiple aliased memory addresses.

8. The apparatus of claim 7 wherein each of the plurality of entries in the reuse invalidation buffer further includes a size of the memory area covering multiple aliased memory addresses.

9. The apparatus of claim 8 wherein the processor core is to invalidate the instance upon determining that the particular version of the instance is current.

10. A method comprising:
encountering a reuse region;
determining that a reuse buffer does not include a valid instance for the reuse region;
detecting an aliased memory operation instruction in the reuse region; and
adding new instance information to a corresponding entry in a reuse invalidation buffer,
the new instance information in the reuse invalidation buffer including at least a first pointer is a reuse instance index pointing to a new instance in the reuse buffer and a second pointer is a version index pointing to a particular version of a new instance held in the reuse buffer.

11. The method of claim 10 further comprising setting a current version of the new instance in the reuse buffer when reaching the end of the reuse region.

12. The method of claim 11 wherein;
the reuse buffer contains a plurality of instances of the reuse region, each of the plurality of instances including a set of version bits and a current version counter; and
setting the current version of the new instance in the reuse buffer comprises modifying a corresponding set of version bits and a corresponding current version counter.

13. The method of claim 12 further comprising pointing the version index in the entry of the reuse invalidation buffer to a particular version bit within a set of version bits of the new reuse instance, the particular version bit indicating that the created version of the new reuse instance is current.

14. A computer readable medium comprising instructions, which when executed on a processor, perform a method comprising:
encountering a reuse region;
determining that a reuse buffer does not include a valid instance for the reuse region;
detecting an abased memory operation instruction in the reuse region; and
adding new instance information to a corresponding entry in a reuse invalidation buffer,
the new instance information in the reuse invalidation buffer including at least a first pointer is a reuse instance index pointing to a new instance in the reuse buffer and a second pointer is a version index pointing to a particular version of a new instance held in the reuse buffer.

15. The computer readable medium of claim 14 wherein the method further comprises setting a current version of the new instance in the reuse buffer when reaching the end of the reuse region.

* * * * *

UNITED STATES PATENT AND TRADEMARK OFFICE
CERTIFICATE OF CORRECTION

PATENT NO. : 7,383,543 B2
APPLICATION NO. : 10/410032
DATED : June 3, 2008
INVENTOR(S) : Wu It is certified that error appears in the above-identified patent and that said Letters Patent is hereby corrected as shown below:

In column 12, at line 51, delete "abased" and insert --aliased--.

Signed and Sealed this

Eighteenth Day of November, 2008

JON W. DUDAS
*Director of the United States Patent and Trademark Office*